(12) United States Patent
Yoshino et al.

(10) Patent No.: US 10,723,898 B2
(45) Date of Patent: *Jul. 28, 2020

(54) ACTIVE ENERGY RAY CURABLE COMPOSITION, ACTIVE ENERGY RAY CURABLE INK, INKJET INK, STEREOSCOPIC MODELING MATERIAL, ACTIVE ENERGY RAY CURABLE COMPOSITION CONTAINER, INKJET RECORDING METHOD, TWO-DIMENSIONAL OR THREE-DIMENSIONAL IMAGE FORMING APPARATUS, CURED PRODUCT, AND PROCESSED PRODUCT

(71) Applicant: RICOH COMPANY, LTD., Tokyo (JP)

(72) Inventors: Mie Yoshino, Kanagawa (JP); Manabu Arita, Kanagawa (JP); Shizuka Kohzuki, Kanagawa (JP); Hiroki Kobayashi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/126,568

(22) Filed: Sep. 10, 2018

(65) Prior Publication Data

US 2019/0002716 A1 Jan. 3, 2019

Related U.S. Application Data

(63) Continuation of application No. 15/202,858, filed on Jul. 6, 2016, now Pat. No. 10,100,211.

(30) Foreign Application Priority Data

Jul. 15, 2015 (JP) .................. 2015-141460

(51) Int. Cl.
*C09D 11/107* (2014.01)
*C09D 11/101* (2014.01)
(Continued)

(52) U.S. Cl.
CPC ............ *C09D 11/107* (2013.01); *B33Y 70/00* (2014.12); *B41J 11/002* (2013.01); *C08F 222/14* (2013.01);
(Continued)

(58) Field of Classification Search
CPC ........ B41J 11/002; B33Y 70/00; B33Y 10/00; B33Y 30/00; C08F 222/38; C08F 222/14;
(Continued)

(56) References Cited

U.S. PATENT DOCUMENTS

2006/0154082 A1* 7/2006 Miller ................. C08F 290/067
428/423.1
2009/0171007 A1* 7/2009 Jonai .................... C09D 11/101
524/548

(Continued)

FOREIGN PATENT DOCUMENTS

EP 2 848 660 A1 3/2015
JP 2003-160626 6/2003
(Continued)

OTHER PUBLICATIONS

Japanese Office Action dated May 28, 2019, in Patent Application No. 2015-141460, 5 pages.
(Continued)

*Primary Examiner* — Thinh H Nguyen
(74) *Attorney, Agent, or Firm* — Oblon, McClelland, Maier & Neustadt, L.L.P.

(57) ABSTRACT

In accordance with some embodiments of the present invention, an active energy ray curable composition including a polymerizable compound composition is provided. When
(Continued)

the active energy ray curable composition is formed into a film having an average thickness of 10 μm on a substrate and, after a lapse of 15 seconds, the film is irradiated with an active energy ray having a light quantity of 1,500 mJ/cm$^2$ to become a cured product, the cured product satisfies the following conditions (1) and (2):
   (1) when the substrate is a polypropylene substrate, the cured product has a glass transition temperature of 60° C. or more; and
   (2) when the substrate is a polycarbonate substrate, an adhesion between the polycarbonate substrate and the cured product is 70 or more, the adhesion being measured according to a cross-cut adhesion test defined in Japanese Industrial Standards K5400.

20 Claims, 3 Drawing Sheets

(51) Int. Cl.
   | | | |
   |---|---|---|
   | *C09D 11/324* | (2014.01) | |
   | *B33Y 70/00* | (2020.01) | |
   | *B41J 11/00* | (2006.01) | |
   | *C08F 222/14* | (2006.01) | |
   | *C08F 222/38* | (2006.01) | |
   | *C09D 11/30* | (2014.01) | |
   | *B33Y 10/00* | (2015.01) | |
   | *B33Y 30/00* | (2015.01) | |

(52) U.S. Cl.
   CPC .......... *C08F 222/38* (2013.01); *C09D 11/101* (2013.01); *C09D 11/30* (2013.01); *C09D 11/324* (2013.01); *B33Y 10/00* (2014.12); *B33Y 30/00* (2014.12)

(58) Field of Classification Search
   CPC ..... C09D 11/107; C09D 11/101; C09D 11/30; C09D 11/324
   See application file for complete search history.

(56) References Cited

U.S. PATENT DOCUMENTS

| | | |
|---|---|---|
| 2011/0159251 A1 | 6/2011 | Sato et al. |
| 2012/0086762 A1 | 4/2012 | Noguchi et al. |
| 2012/0147103 A1 | 6/2012 | Hasegawa et al. |
| 2012/0176456 A1 | 7/2012 | Maekawa et al. |
| 2012/0200648 A1 | 8/2012 | Hiraoka et al. |
| 2012/0242768 A1 | 9/2012 | Seno et al. |
| 2012/0293589 A1 | 11/2012 | Hiraoka |
| 2013/0065024 A1 | 3/2013 | Aruga et al. |
| 2013/0321539 A1 | 12/2013 | Hiraoka |
| 2014/0125744 A1 | 5/2014 | Hiraoka |
| 2014/0139596 A1 | 5/2014 | Hiraoka |
| 2014/0139597 A1 | 5/2014 | Hiraoka |
| 2014/0240414 A1 | 8/2014 | Hiraoka |
| 2014/0327719 A1 | 11/2014 | Hiraoka |
| 2014/0336298 A1 | 11/2014 | Hiraoka |
| 2014/0338562 A1 | 11/2014 | Hiraoka |
| 2015/0009265 A1 | 1/2015 | Kohzuki et al. |
| 2015/0042731 A1 | 2/2015 | Hiraoka |
| 2015/0077481 A1 | 3/2015 | Yoshino et al. |
| 2015/0091986 A1 | 4/2015 | Seno et al. |
| 2015/0099819 A1 | 4/2015 | Hiraoka |
| 2015/0126636 A1 | 5/2015 | Hiraoka |
| 2015/0130878 A1 | 5/2015 | Kohzuki et al. |
| 2015/0232675 A1 | 8/2015 | Yoshino et al. |
| 2015/0232676 A1 | 8/2015 | Hiraoka |
| 2015/0232677 A1 | 8/2015 | Hiraoka |
| 2015/0329729 A1 | 11/2015 | Hiraoka |
| 2016/0009931 A1 | 1/2016 | Kohzuki et al. |
| 2016/0075895 A1 | 3/2016 | Kohzuki et al. |

FOREIGN PATENT DOCUMENTS

| | | |
|---|---|---|
| JP | 2007-56162 A | 3/2007 |
| JP | 2007-056232 | 3/2007 |
| JP | 2011-52107 A | 3/2011 |
| JP | 2013-043894 | 3/2013 |
| JP | 2015-81284 A | 4/2015 |
| JP | 2015-81294 A | 4/2015 |
| JP | 2015-083656 | 4/2015 |
| JP | 2015-117359 A | 6/2015 |
| WO | WO 2008/045517 A2 | 4/2008 |
| WO | WO 2008/045517 A3 | 4/2008 |

OTHER PUBLICATIONS

Japanese Notice with the Dispatch dated Feb. 5, 2019, in Patent Application No. 2015-141460, 1 page.
Japanese Publication Submission Paper submitted by a third party dated Jan. 28, 2019, in Patent Application No. 2015-141460, 3 pages (with English translation).
U.S. Appl. No. 14/837,423, filed Aug. 27, 2015.
Extended European Search Report dated Sep. 15, 2016 in Patent Application No. 16178718.9.

* cited by examiner

ACTIVE ENERGY RAY CURABLE COMPOSITION, ACTIVE ENERGY RAY CURABLE INK, INKJET INK, STEREOSCOPIC MODELING MATERIAL, ACTIVE ENERGY RAY CURABLE COMPOSITION CONTAINER, INKJET RECORDING METHOD, TWO-DIMENSIONAL OR THREE-DIMENSIONAL IMAGE FORMING APPARATUS, CURED PRODUCT, AND PROCESSED PRODUCT

CROSS-REFERENCE TO RELATED APPLICATIONS

This patent application is a continuation of U.S. Ser. No. 15/202,858, filed Jul. 6, 2016, which is based on and claims, priority pursuant to 35 U.S.C. § 119(a) to Japanese Patent Application No, 2015-141460, filed on Jul. 15, 2015, in the Japan Patent Office, the entire disclosure of which is hereby incorporated by reference herein.

BACKGROUND

Technical Field

The present disclosure relates to an active energy ray curable composition, an active energy ray curable ink, an inkjet ink, a stereoscopic modeling material, an active energy ray curable composition container, an inkjet recording method, a two-dimensional or three-dimensional image forming apparatus, a cured product, and a processed product.

Description of the Related Art

Active energy ray curable inks can be applied to building materials and decorative printings by means of inkjet printing. In a case in which the cured product of an active energy ray curable ink is used for a building material, the building material will be exposed to sunlight and a high indoor temperature in excess of 50° C. in summer season. If something is put on such a heated building material, an undesired dent will be made thereon unless the cured product of the active energy ray curable ink exhibits high strength at such high temperatures.

SUMMARY

In accordance with some embodiments of the present invention, an active energy ray curable composition is provided. The active energy ray curable composition includes a polymerizable compound composition. When the active energy ray curable composition is formed into a film having an average thickness of 10 μm on a substrate and, after a lapse of 15 seconds, the film is irradiated with an active energy ray having a light quantity of 1,500 mJ/cm$^2$ to become a cured product, the cured product satisfies the following conditions (1) and (2):

(1) when the substrate is a polypropylene substrate, the cured product has a glass transition temperature of 60° C. or more; and (2) when the substrate is a polycarbonate substrate, an adhesion between the polycarbonate substrate and the cured product is 70 or more, the adhesion being measured according to a cross-cut adhesion test defined in Japanese Industrial Standards K5400.

In accordance with some embodiments of the present invention, an active energy ray curable ink is provided. The active energy ray curable ink includes the above active energy ray curable composition.

In accordance with some embodiments of the present invention, an inkjet ink is provided. The inkjet ink includes the above active energy ray curable ink.

In accordance with some embodiments of the present invention, a stereoscopic modeling material is provided. The stereoscopic modeling material includes the above active energy ray curable composition.

In accordance with some embodiments of the present invention, an active energy ray curable composition container is provided. The active energy ray curable composition container includes a container and the above active energy ray curable composition contained in the container.

In accordance with some embodiments of the present invention, an inkjet recording method is provided. The method includes the steps of: applying a first active energy ray curable ink including a first active energy ray curable composition to a substrate; emitting a first active energy ray to the first active energy ray curable ink on the substrate; applying a second active energy ray curable ink including a second active energy ray curable composition to the first active energy ray curable ink having been irradiated with the first active energy ray; and emitting a second active energy ray to the second active energy ray curable ink. In the method, the first active energy ray curable composition and the second active energy ray curable composition each include the above active energy ray curable composition, and the first active energy ray curable composition and the second active energy ray curable composition are either the same or different. In addition, a first time period from the applying of the first active energy ray curable ink to the emitting of the first active energy ray is longer than a second time period from the applying of the second active energy ray curable ink to the emitting of the second active energy ray.

In accordance with some embodiments of the present invention, a two-dimensional or three-dimensional image forming apparatus is provided. The two-dimensional or three-dimensional image forming apparatus includes: an applier to apply the above active energy ray curable composition to a substrate; an emitter to emit an active energy ray; and a controller to control a time period from when the active energy ray curable composition is applied to when the active energy ray is emitted.

In accordance with some embodiments of the present invention, a cured product is provided. The cured product is produced by a method including the step of emitting an active energy ray to the above active energy ray curable composition to cause the active energy ray composition to cure.

In accordance with some embodiments of the present invention, a processed product is provided. The processed product is produced by a method including the step of stretching-processing or punching-processing the above cured product.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

Figure 1A:
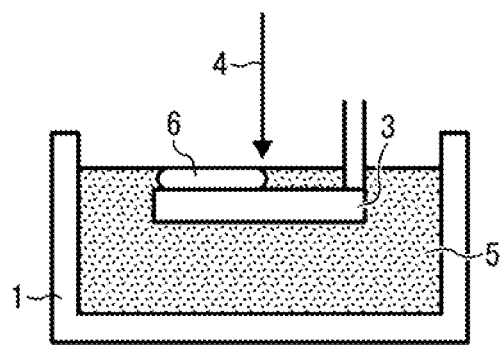
FIGS. 1A to 1D are schematic views of an image forming apparatus according to an embodiment of the present invention.
Figure 1B:
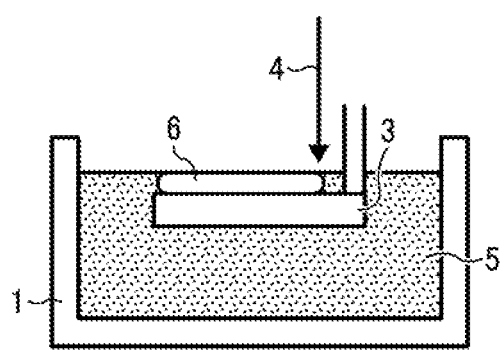
Figure 1C:
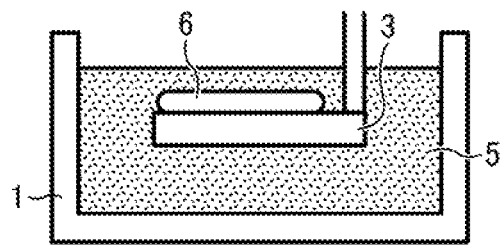
Figure 1D:
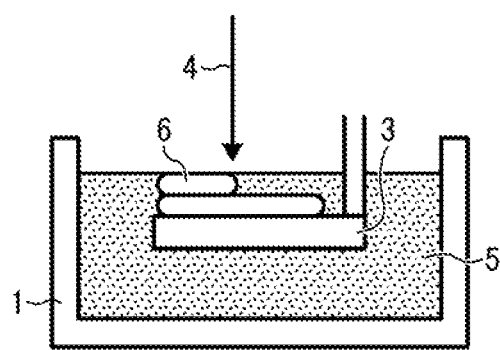

The accompanying drawings are intended to depict example embodiments of the present invention and should not be interpreted to limit the scope thereof. The accompanying drawings are not to be considered as drawn to scale unless explicitly noted.

DETAILED DESCRIPTION

Embodiments of the present invention are described in detail below with reference to accompanying drawings. In describing embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

For the sake of simplicity, the same reference number will be given to identical constituent elements such as parts and materials having the same functions and redundant descriptions thereof omitted unless otherwise stated.

In view of this situation, one object of the present of the invention is to provide an active energy ray curable composition which is capable of becoming a cured product having a good combination of strength and adhesion property.

In accordance with some embodiments of the present invention, an active energy ray curable composition is provided, which is capable of becoming a cured product having a good combination of strength and adhesion property.

Active Energy Ray Curable Composition

The active energy ray curable composition according to an embodiment of the present invention includes at least a polymerizable compound composition. The active energy ray curable composition may optionally include other components, if necessary. The active energy ray curable composition can be used for inkjet inks.

The use application of the active energy ray curable composition is not limited, but is preferably used for active energy ray curable inks, in particular, inkjet inks.

Polymerizable Compounds

Polymerizable compounds generally refer to compounds which undergo a polymerization reaction by the action of active energy rays, such as ultraviolet ray and electron beam, to cure. The polymerizable compound composition according to an embodiment of the present invention includes at least one polymerizable compound. Examples of the polymerizable compound include both monofunctional polymerizable compounds and polyfunctional polymerizable compounds. In the present disclosure, the polymerizable compound generally refers to a compound which has not undergone a polymerizable reaction. The polymerizable compound is not limited in molecular weight.

Monofunctional Polymerizable Compounds

Specific examples of the monofunctional polymerizable compounds include, but are not limited to, diethylacrylamide, 2-hydroxyethyl acrylate, 2-hydroxypropyl acrylate, 4-hydroxybutyl acrylate, isobutyl acrylate, t-butyl acrylate, isooctyl acrylate, 2-methoxyethyl acrylate, methoxytriethylene glycol acrylate, 2-ethoxyethyl acrylate, 3-methoxybutyl acrylate, ethoxyethyl acrylate, butoxyethyl acrylate, ethoxydiethylene glycol acrylate, methoxydipropylene glycol acrylate, dipropylene glycol acrylate, β-carboxyethyl acrylate, ethyl diglycol acrylate, trimethylolpropane formal monoacrylate, imide acrylate, isomayl acrylate, ethoxylated succinic acid acrylate, trifluoroethyl acrylate, ω-carboxy-polycaprolactone monoacrylate, N-vinylformamide, cyclohexyl acrylate, tetrahydrofurfuryl acrylate, benzyl acrylate, methylphenoxyethyl acrylate, 4-t-butylcyclohexyl acrylate, caprolactone-modified tetrahydrofurfuryl acrylate, tribromophenyl acrylate, ethoxylated tribromophenyl acrylate, 2-phenoxyethyl acrylate (or ethylene oxide and/or propylene oxide adduct monomers thereof), acryloyl morpholine, isobornyl acrylate, phenoxydiethylene glycol acrylate, vinylcaprolactam, vinylpyrrolidone, 2-hydroxy-3-phenoxypropyl acrylate, and 1,4-cyclohexanedimethanol monoacrylate. Each of these compounds can be used alone or in combination with others.

Monofunctional Polymerizable Compound (B)

Specifically, a monofunctional polymerizable compound, the homopolymer of which having a glass transition temperature (Tg) of 90° C. or more, is preferable. Such a monofunctional polymerizable compound, the homopolymer of which having a glass transition temperature (Tg) of 90° C. or more, provides sufficient strength.

Specific examples of such a monofunctional polymerizable compound, the homopolymer of which having a glass transition temperature (Tg) of 90° C. or more, include, but are not limited to, hydroxyethyl acrylamide, hydroxyethyl methacrylamide, isobornyl acrylate, isobornyl methacrylate, adamantyl acrylate, adamantyl methacrylate, 2-methyl-2-adamantyl acrylate, 2-methyl-2-adamantyl methacrylate, acryloyl morpholine, methacryloyl morpholine, dimethylaminopropyl acrylamide, dicyclopentenyl acrylate, dicyclopentenyl methacrylate, dicyclopentanyl acrylate, dicyclopentanyl methacrylate, dicyclopentenyloxyethyl acrylate, dicyclopentenloxyethyl methacrylate, 3,3,5-trimethylcyclohexane acrylate, and 3,3,5-trimethylcyclohexane methacrylate. Each of these compounds can be used alone or in combination with others. Among these compounds, those having a cyclic structure are preferable.

Specific examples of such polymerizable compounds having a cyclic structure include, but are not limited to, isobornyl acrylate and isobornyl methacrylate each having an isobornyl ring, adamantyl acrylate and adamantyl methacrylate each having an adamantyl ring, and acryloyl morpholine and methacryloyl morpholine each having a morpholine ring. When an ink includes such a polymerizable compound having a cyclic structure, a cured product of the ink provides sufficient strength.

Preferably, the polymerizable compound composition includes a monofunctional polymerizable compound (B) having one polymerizable ethylenic unsaturated double bond, the homopolymer of which having a glass transition temperature (Tg) of 90° C. or more, in an amount of 60% by mass or more, more preferably from 80% to 95% by mass, based on the total amount of the polymerizable compound composition.

Measurement of Glass Transition Temperature of Homopolymers

In the present disclosure, glass transition temperature (Tg) values of homopolymers are those disclosed in their monomer-manufacturer's catalogs, if any. Otherwise, Tg values of homopolymers were actually measured by means of differential scanning calorimetry (DSC) as follows.

First, a monofunctional polymerizable compound was subjected to a typical liquid polymerization.

A toluene solution which contains 90 parts by mass of toluene, 10 parts by mass of a monofunctional polymerizable compound, and 0.5 parts by mass of azobis isobutyronitrile serving as a polymerization was enclosed in a test tube under a nitrogen purge. The test tube was shaken in a hot bath having a temperature of 60° C. for 6 hours, to prepare a polymer. The polymer was then reprecipitated in a solvent in which the monofunctional polymerizable compound is soluble but the polymer is insoluble (e.g., methanol, petroleum ether) and isolated by filtration. The isolated polymer was subjected to a DSC measurement using an instrument DSC120U available from Seiko Instruments Inc. while setting the measurement temperature to in the range of from 30° C. to 300° C. and the temperature rising rate to 2.5° C./min.

Polyfunctional Polymerizable Compound (C)

Preferably, the active energy ray curable composition according to an embodiment of the present invention includes a polyfunctional polymerizable compound (C) having at least two polymerizable ethylenic unsaturated double bonds, other than the monofunctional polymerizable compound (B) described above.

Specific examples of the polyfunctional polymerizable compound (C) include, but are not limited to, neopentyl glycol diacrylate, neopentyl glycol dimethacrylate, ethylene glycol diacrylate, ethylene glycol dimethacrylate, polyethylene glycol diacrylate, polyethylene glycol dimethacrylate, diethylene glycol diacrylate, diethylene glycol dimethacrylate, triethylene glycol diacrylate, triethylene glycol dimethacrylate, tetraethylene glycol acrylate, tetraethylene glycol dimethacrylate, polypropylene glycol diacrylate, polypropylene glycol dimethacrylate, tetramethylene glycol diacrylate, tetramethylene glycol dimethacrylate, polytetramethylene glycol diacrylate, polytetramethylene glycol dimethacrylate, propylene oxide (hereinafter "PO") adduct of bisphenol A diacrylate, PO adduct of bisphenol A dimethacrylate, ethoxylated neopentyl glycol diacrylate, ethoxylated neopentyl glycol dimethacrylate, propoxylated neopentyl glycol diacrylate, propoxylated neopentyl glycol dimethacrylate, ethylene oxide (hereinafter "EO") adduct of bisphenol A diacrylate, EO adduct of bisphenol A dimethacrylate, EO-modified pentaerythritol triacrylate, EO-modified pentaerythritol trimethacrylate, PO-modified pentaerythritol triacrylate, PO-modified pentaerythritol trimethacrylate, EO-modified pentaerythritol tetraacrylate, EO-modified pentaerythritol tetramethacrylate, PO-modified pentaerythritol tetraacrylate, PO-modified pentaerythritol tetramethacrylate, EO-modified dipentaerythritol tetraacrylate, EO-modified dipentaerythritol tetramethacrylate, PO-modified dipentaerythritol tetraacrylate, PO-modified dipentaerythritol tetramethacrylate, EO-modified trimethylolpropane triacrylate, EO-modified trimethylolpropane trimethacrylate, PO-modified trimethylolpropane triacrylate, PO-modified trimethylolpropane trimethacrylate, EO-modified tetramethylolmethane tetraacrylate, EO-modified tetramethylolmethane tetramethacrylate, PO-modified tetramethylolmethane tetraacrylate, PO-modified tetramethylolmethane tetramethacrylate, pentaerythritol triacrylate, pentaerythritol trimethacrylate, pentaerythritol tetraacrylate, pentaerythritol tetramethacrylate, dipentaerythritol tetraacrylate, dipentaerythritol tetramethacrylate, trimethylolpropane triacrylate, trimethylolpropane trimethacrylate, tetramethylolmethane tetraacrylate, tetramethylolmethane tetramethacrylate, trimethylolethane triacrylate, trimethylolethane trimethacrylate, trimethylolpropane triacrylate, trimethylolpropane trimethacrylate, bis(4-acryloxypolyethoxyphenyl)propane, bis(4-methacryloxypolyethoxyphenyl)propane, diallyl phthalate, triallyl trimellitate, 1,6-hexanediol diacrylate, 1,6-hexanediol dimethacrylate, 1,9-nonanediol diacrylate, 1,9-nonanediol dimethacrylate, 1,3-butylene glycol diacrylate, 1,3-butylene glycol dimethacrylate, 1,10-decanediol diacrylate, 1,10-decanediol dimethacrylate, hydroxypivalic acid neopentyl glycol diacrylate, hydroxypivalic acid neopentyl glycol dimethacrylate, tetramethylolmethane triacrylate, tetramethylolmethane trimethacrylate, dimethylol tricyclodecane diacrylate, dimethylol tricyclodecane dimethacrylate, modified glycerin triacrylate, modified glycerin trimethacrylate, bisphenol A glycidyl ether acrylic acid adduct, bisphenol A glycidyl ether methacrylic acid adduct, modified bisphenol A diacrylate, modified bisphenol A dimethacrylate, caprolactone-modified dipentaerythritol hexaacrylate, caprolactone-modified dipentaerythritol hexamethacrylate, dipentaerythritol hexaacrylate, dipentaerythritol hexamethacrylate, pentaerythritol triacrylate tolylene diisocyanate urethane polymer, pentaerythritol trimethacrylate tolylene diisocyanate urethane polymer, pentaerythritol triacrylate hexamethylene diisocyanate urethane polymer, pentaerythritol trimethacrylate hexamethylene diisocyanate urethane polymer, ditrimethylolpropane tetraacrylate, ditrimethylolpropane tetramethacrylate, pentaerythritol triacrylate hexamethylene diisocyanate urethane prepolymer, and pentaerythritol trimethacrylate hexamethylene diisocyanate urethane prepolymer.

Specific examples of the polyfunctional polymerizable compound (C) further include, but are not limited to, 1,4-butanediol diacrylate, 1,4-butanediol dimethacrylate, polyethylene glycol (200) diacrylate, polyethylene glycol (200) dimethacrylate, tripropylene glycol diacrylate, tripropylene glycol dimethacrylate, polyethylene glycol (400) diacrylate, polyethylene glycol (400) dimethacrylate, ethoxylated (3) bisphenol A diacrylate, ethoxylated (3) bisphenol A dimethacrylate, dipropylene glycol diacrylate, dipropylene glycol dimethacrylate, alkoxylated hexanediol diacrylate, alkoxylated hexanediol dimethacrylate, ethoxylated (4) bisphenol A diacrylate, ethoxylated (4) bisphenol A dimethacrylate, ethoxylated (10) bisphenol A diacrylate, ethoxylated (10) bisphenol A dimethacrylate, polyethylene glycol (600) diacrylate, polyethylene glycol (600) dimethacrylate, tricyclodecane dimethanol diacrylate, tricyclodecane dimethanol dimethacrylate, polytetramethylene glycol diacrylate, polytetramethylene glycol dimethacrylate, 3-methyl-1,5-pentanediol diacrylate, 3-methyl-1,5-pentanediol dimethacrylate, methylol tricyclodecane diacrylate, methylol tricyclodecane dimethacrylate, CN9005, C9007, CN9009, CN9011, CN9018, CN9028, CN9178, CN9290, CN9783, CN9893, CN902, CN973, CN977, CN978, CN992, CN994, CN999, CN9167, CN9782, and CN9783. Each of these compounds can be used alone or in combination with others. Among these compounds, those having a functional group number of from 2 to 5 are preferable, and those having a functional group number of 2 are more preferable.

More specifically, polyethylene glycol (200) diacrylate, polyethylene glycol (400) diacrylate, polyethylene glycol (600) diacrylate, 1,3-butylene glycol diacrylate, 1,4-butanediol diacrylate, 1,6-hexanediol diacrylate, 1,9-nonanediol diacrylate, 1,10-decanediol diacrylate, and neopentyl glycol diacrylate, each having a straight-chain structure, are preferable.

Polyethylene glycol (200) diacrylate, polyethylene glycol (400) diacrylate, and polyethylene glycol (600) diacrylate are represented by the following formulae.

Polyethylene glycol (200) diacrylate: $CH_2=CH-CO-(OC_2H_4)_n-OCOCH-CH_2n$ ($n \approx 4$)

Polyethylene glycol (400) diacrylate: $CH_2=CH-CO-(OC_2H_4)_n-OCOCH-CH_2n$ ($n \approx 9$)

Polyethylene glycol (600) diacrylate: $CH_2=CH-CO-(OC_2H_4)_n-OCOCH-CH_2n$ ($n \approx 14$)

Oligomer

Specific examples of the polyfunctional polymerizable compound (C) further include oligomers. Specific examples of polyfunctional oligomers include, but are not limited to, urethane oligomers. Urethane oligomers are commercially available. Specific examples of commercially-available urethane oligomers include, but are not limited to, UV-2000B, UV-2750B, UV-3000B, UV-3010B, UV3200B, UV-3300B, UV-3700B, UV-6640B, UV-8630B, UV-7000B, UV-7610B, UV-1700B, UV-7630B, UV-6300B, UV-6640B, UV-7550B, UV-7600B, UV-7605B, UV-7610B, UV-7630B, UV-7640B, UV-7650B, UT-5449, and UT-5454 (available from The Nippon Synthetic Chemical Industry Co., Ltd.); CN929, CN961E75, CN961H81, CN962, CN963, CN963A80, CN963B80, CN963E75, CN963E80, CN963J85, CN965, CN965A80, CN966A80, CN966H90, CN966J75, CN968, CN981, CN981A75, CN981B88, CN982, CN982A75, CN982B88, CN982E75, CN983, CN985B88, CN9001, CN9002, CN9788, CN970A60, CN970E60, CN971, CN971A80, CN972, CN973A80, CN973H85, CN973J75, CN975, CN977C70, CN978, CN9782, CN9783, CN996, and CN9893 (available from Tomoe Engineering Co., Ltd.); and EBECRYL 210, EBECRYL 220, EBECRYL 230, EBECRYL 270, KRM 8200, EBECRYL 5129, EBECRYL 8210, EBECRYL 8301, EBECRYL 8804, EBECRYL 8807, EBECRYL 9260, KRM 7735, KRM 8296, KRM 8452, EBECRYL 4858, EBECRYL 8402, EBECRYL 9270, EBECRYL 8311, and EBECRYL 8701 (available from DAICEL-ALLNEX LTD.). Each of these compounds can be used alone or in combination with others. Among these compounds, those having 2 to 5 polymerizable ethylenic unsaturated double bonds are preferable. To provide good stretchability, those having 2 polymerizable ethylenic unsaturated double bonds are more preferable.

The urethane oligomer preferably has a weight average molecular weight of from 5,000 to 13,000, more preferably from 10,000 to 13,000. When the weight average molecular weight is 5,000 or more, good stretchability is provided. When the weight average molecular weight is 13,000 or less, the viscosity becomes more suitable for inkjet inks.

The polymerizable compound composition preferably includes the polyfunctional polymerizable compound (C) having at least two polymerizable ethylenic unsaturated double bonds in an amount of less than 20% by mass, more preferably 15% by mass or less, based on the total amount of the polymerizable compound composition. To provide good strength, the amount of the polyfunctional polymerizable compound (C) is preferably 5% by mass or more, more preferably 20% by mass or more, based on the total amount of the polymerizable compound composition. To provide both strength and stretchability at the same time, the amount of the polyfunctional polymerizable compound (C) is preferably 5% by mass or more and less than 20% by mass, based on the total amount of the polymerizable compound composition.

In a general case in which the amount of a polyfunctional polymerizable compound is large, or the amount of a monofunctional polymerizable compound, the homopolymer of which having a relatively high glass transition temperature, is large, the internal stress is increased and the adhesion property is likely to be blocked. Therefore, the polymerizable compound composition preferably includes a polymerizable compound (A) capable of dissolving a polycarbonate substrate in an amount of 30% by mass or more based on the total amount of the polymerizable compound composition.

Polymerizable Compound (A) Capable of Dissolving Polycarbonate Substrate

The polymerizable compound composition preferably includes a polymerizable compound (A) capable of dissolving a polycarbonate substrate.

The polymerizable compound (A) capable of dissolving a polycarbonate substrate may be either a monofunctional polymerizable compound or a polyfunctional polymerizable compound.

Specific examples of such a monofunctional polymerizable compound include, but are not limited to, tetrahydrofurfuryl acrylate, benzyl acrylate, cyclohexyl acrylate, and acryloyl morpholine. Specific examples of such a polyfunctional polymerizable compound include, but are not limited to, diethylene glycol diacrylate, diethylene glycol dimethacrylate, and 1,4-butanediol diacrylate.

The polymerizable compound composition preferably includes the polymerizable compound (A) capable of dissolving a polycarbonate substrate in an amount of 30% by mass or more, more preferably 40% by mass or more, based on the total amount of the polymerizable compound composition.

Whether a polymerizable compound is capable of dissolving a polycarbonate substrate or not can be determined by the potting test described below. In the potting test, one drop of a polymerizable compound is placed on the surface of a polycarbonate substrate with a dropper, and 15 seconds later, the polymerizable compound is wiped off with a wiper (BEMCOT® M-3II available from Asahi Kasei Corporation) which is not likely to produce fiber waste. Whether the polycarbonate substrate has been dissolved by the polymerizable compound or not is determined by visually observing the polycarbonate substrate with a loupe of 25 magnifications (PEAK POCKET MICROSCOPE 25× available from Tohkai Sangyo Co., Ltd.) and touching it with fingers.

Glass Transition Temperature and Storage Elastic Modulus of Cured Product

When the active energy ray curable composition according to an embodiment of the present invention is formed into a film having an average thickness of 10 μm on a polypropylene substrate and, after a lapse of 15 seconds, the film is irradiated with an active energy ray having a light quantity of 1,500 mJ/cm² to become a cured product, the cured product satisfies the following condition (1);

(1) The cured product has a glass transition temperature of 60° C. or more.

In addition, the cured product preferably has a storage elastic modulus of $1 \times 10^6$ Pa or more at 60° C.

Glass transition temperature and storage elastic modulus of the cured product are measured as follows.

The active energy ray curable composition is formed into a film having an average thickness of 10 μm on a polypropylene substrate using a wire bar (Winding #6 available from Kobayashi Engineering Works., Ltd.). After a lapse of 15 seconds, the film is irradiated with an active energy ray having a wavelength within the UV-A region (from 350 to 400 nm) and a light quantity of 1,500 mJ/cm$^2$ emitted from a UV emitter (LH6 available from Fusion UV Systems Japan K.K.), thus obtaining a cured product. The cured product on the polypropylene substrate is cut into a piece having a width of 10 mm and a length of 40 mm, gently peeled off, and subjected to a measurement with a dynamic viscoelasticity measuring instrument DMS6100 (available from Seiko Instruments Inc.) while setting the distance between chucks to 20 mm, the measurement frequency to 1 Hz, the measurement temperature range to from 30° C. to 130° C., and the temperature rising rate to 1° C./min.

Glass transition temperature is determined from a peak top temperature with respect to tan δ in the resulting profile. Storage elastic modulus at 60° C. is read from the profile.

The cured product of the active energy ray curable composition according to an embodiment of the present invention has a glass transition temperature of 60° or more, more preferably 80° C. or more, and most preferably 100° C. or more. In addition, the cured product of the active energy ray curable composition according to an embodiment of the present invention preferably has a storage elastic modulus of 1×10$^6$ Pa or more at 60° C. Thus, the cured product is given improved elasticity and strength.

Adhesion Between Cured Product and Substrate

When the active energy ray curable composition according to an embodiment of the present invention is formed into a film having an average thickness of 10 μm on a polycarbonate substrate and, after a lapse of 15 seconds, the film is irradiated with an active energy ray having a light quantity of 1,500 mJ/cm$^2$ to become a cured product, the cured product satisfies the following condition (2); (2) An adhesion between the polycarbonate substrate and the cured product is 70 or more, when the adhesion is measured according to a cross-cut adhesion test defined in Japanese Industrial Standards K5400.

The adhesion between the cured product and the substrate is measured as follows.

The active energy ray curable composition is formed into a film having an average thickness of 10 μm on a substrate using a wire bar (Winding #6 available from Kobayashi Engineering Works., Ltd.). After a lapse of 15 seconds, the film is irradiated with an active energy ray having a wavelength within the UV-A region (from 350 to 400 mm) and a light quantity of 1,500 mJ/cm$^2$ emitted from a UV emitter (LH6 available from Fusion UV Systems Japan K.K.), thus obtaining a cured product.

As the substrate, a polycarbonate (PC) film (Iupilon® 100FE2000 Masking, having a thickness of 100 μm, available from Mitsubishi Engineering-Plastics Corporation) can be used.

The cured product formed on the substrate, i.e., a polycarbonate (PC) film (Iupilon® 100FE2000 Masking, having a thickness of 100 μm, available from Mitsubishi Engineering-Plastics Corporation), is subjected to a cross-cut adhesion test defined in Japanese Industrial Standards K5400 to evaluate the adhesion between the cured product and the substrate.

An adhesion of 100 refers to a state in which no peeling has occurred all over the cross-cut area having 100 lattices. An adhesion of 70 refers to a state in which no peeling has occurred within 70% of the cross-cut area.

The adhesion between the cured product of the active energy ray curable composition according to an embodiment of the present invention and the polycarbonate substrate is 70 or more, preferably 80 or more, and more preferably 95 or more.

To make the active energy ray curable composition satisfy the above-described conditions (1) and (2) to make the cured product thereof provide both strength and adhesion, the active energy ray curable composition preferably includes a good combination of a polymerizable compound having a high glass transition temperature (Tg) and another polymerizable compound capable of dissolving a polycarbonate substrate. Specifically, when the active energy ray curable composition includes a monofunctional polymerizable compound (B) having one polymerizable ethylenic unsaturated double bond, the homopolymer of which having a glass transition temperature (Tg) of 90° C. or more, in an amount of 60% by mass or more based on the total amount of the polymerizable compound composition, the cured product thereof provides an improved strength.

When the cured product has a glass transition temperature of 60° C. or more, the cured product can maintain a glass state without degrading its strength even when heated to about 50° C. by exposure to direct sunlight at normal temperature or indoor. The cured product preferably has a glass transition temperature of 80° or more, more preferably 100° C. or more. When the cured product also has a storage elastic modulus of 1 Ma or more at 60° C., the cured product provides improved elasticity and strength.

The active energy ray curable composition according to an embodiment of the present invention is preferably capable of dissolving a polycarbonate substrate, to have good adhesion property.

Whether the active energy ray curable composition is capable of dissolving a polycarbonate substrate or not can be determined by the potting test described below. In the potting test, one drop of the active energy ray curable composition is placed on the surface of a polycarbonate substrate with a dropper, and 15 seconds later, the active energy ray curable composition is wiped off with a wiper (BEMCOT® M-3II available from Asahi Kasei Corporation) which is not likely to produce fiber waste. Whether the polycarbonate substrate has been dissolved by the active energy ray curable composition or not is determined by visually observing the polycarbonate substrate with a loupe of 25 magnifications (PEAK POCKET MICROSCOPE 25× available from Tohkai Sangyo Co., Ltd.) and touching it with fingers.

The adhesion of the cured product of the active energy ray active energy ray curable composition to a polycarbonate substrate correlates with the substrate-dissolving property of the active energy ray curable composition. The higher the polycarbonate-substrate-dissolving ability of the active energy ray curable composition, the higher the adhesion of the cured product of the active energy ray curable composition to the polycarbonate substrate. The polycarbonate-substrate-dissolving ability of the active energy ray curable composition is also influenced by the types and contents of the polymerizable compounds included therein and the length of time during which the active energy ray curable composition and the substrate are in contact with each other. In a case in which the time from when the active energy ray curable composition is brought into contact with a polycarbonate substrate till when the active energy ray curable composition gets cured is relatively long, the influence of the types and contents of the polymerizable compounds is relatively small. By contrast, in a case in which the time from when the active energy ray curable composition is brought into contact with a polycarbonate substrate till when the active energy ray curable composition gets cured is relatively short, the influence of the types and contents of the polymerizable compounds is relatively large.

Thus, when the active energy ray curable composition according to an embodiment of the present invention is formed into a film having an average thickness of 10 μm on a polycarbonate substrate and, after a lapse of 15 seconds, the film is irradiated with an active energy ray having a light quantity of 1,500 mJ/cm$^2$ to become a cured product, the cured product has an adhesion of 70 or more, more preferably 80 or more, and most preferably 95 or more, when measured according to a cross-cut adhesion test defined in Japanese Industrial Standards K5400. It is preferable that the cured product has an adhesion within the above-described range even when the time elapsed after the formation of the film before the irradiation of an active energy ray is 5 seconds.

Active-Energy Ray

Specific examples of the active energy ray include, but are not limited to, ultraviolet ray, electron beam, α-ray, β-ray, γray, and X-ray. When a high-energy light source that emits electron beam, α-ray, β-ray, γ-ray, or X-ray is used, the polymerizable compound can undergo a polymerization reaction without the presence of a polymerization initiator. In the case of ultraviolet ray emission, the polymerizable compound can initiate a polymerization reaction owing to the presence of the photopolymerization initiator.

Polymerization Initiator

Specific examples of the polymerization initiator include, but are not limited to, acrylate compounds, methacrylate compounds, acrylamide compounds, methacrylamide compounds, and vinyl ether compounds, which are photocationic polymerization initiators. It is to be noted that photocationic polymerization initiators are generally expensive. In addition, photocationic polymerization initiators need special care since they slightly generate a strong acid even when not being exposed to light. Therefore, in a case in which a photocationic polymerization initiator is used for an ink, an ink supply path for passing the ink in an inkjet apparatus is preferably given acid resistance. In this case, a restriction is caused in selection of structural members of the inkjet apparatus. On the other hand, the active energy ray curable inkjet ink according to an embodiment of the present invention can include a cheap photopolymerization initiator which generates no strong acid. This makes it possible to produce inks at low costs and to select structural members of the inkjet apparatus without difficulty. Of course, when a high-energy light source that emits electron beam, α-ray, β-ray, γ-ray, or X-ray is used, the polymerizable compound can undergo a polymerization reaction without the presence of a polymerization initiator.

Examples of the polymerization initiator include, but are not limited to, molecular cleavage photopolymerization initiators and hydrogen atom abstraction photopolymerization initiators.

Specific examples of the molecular cleavage photopolymerization initiators include, but are not limited to, 2,2-dimethoxy-1,2-diphenylethane-1-one, 1-hydroxycyclohexyl phenyl ketone, 2-hydroxy-2-methyl-1-phenylpropane-1-one, 1-[4-(2-hydroxyethoxy)-phenyl]-2-hydroxy-2-methyl-1-propane-1-one, 2-hydroxy-1-{4-[4-(2-hydroxy-2-methyl-propionyl)benzyl]phenyl}-2-methyl-1-propane-1-one, 2-hydroxy-2-methyl-1-[4-(1-methylvinyl)phenyl)]propanone, phenylglyoxylic acid methyl ester, 2-methyl-1-[4-(methylthio)phenyl]-2-morpholinopropane-1-one, 2-benzyl-2-dimethylamino-1-(4-morpholinophenyl)butanone-1, 2-dimethylamino-2-(4-methylbenzyl)-1-(4-morpholine-4-yl-phenyl)butane-1-one, bis(2,4,6-trimethylbenzoyl)phenyl-phosphine oxide, bis(2,6-dimethoxybenzoyl)-2,4,4-trimethyl-pentylphosphine oxide, 2,4,6-trimethylbenzoylphosphine oxide, 1,2-octanedione-[4-(phenylthio)-2-(o-benzoyloxime)], ethanone-1-[9-ethyl-6-(2-methylbenzoyl)-9H-carbazole-3-yl]-1-(O-acetyloxime), [4-(methylphenylthio)phenyl]phenylmethanone, and oligo [2-hydroxy-2-methyl-1-[4-(1-methylvinyl)phenyl]propane. Each of these compound can be used alone or in combination with others.

Specific examples of hydrogen atom abstraction photopolymerization initiators include, but are not limited to: benzophenone compounds, such as benzophenone, methylbenzophenone, methyl-2-benzoyl benzoate, 4-benzoyl-4'-methyl diphenyl sulfide, and phenylbenzophenone; and thioxanthone compounds such as 2,4-diethylthioxanthone, 2-chlorothioxanthone, isopropylthioxanthone and 1-chloro-4-propylthioxanthone. Each of these compounds can be used alone or in combination with others.

The content rate of the polymerization initiator to the total amount of the polymerizable compounds is preferably in the range of from 1% to 20% by mass, more preferably from 5% to 10% by mass.

Polymerization Accelerator

As an example of the polymerization accelerator, an amine compound can be used, in combination with the polymerization initiator.

Specific examples of the amine compound include, but are not limited to, ethyl p-dimethylaminobenzoate, 2-ethylhexyl p-dimethylaminobenzoate, methyl p-dimethylaminobenzoate, 2-dimethylaminoethyl benzoate, and butoxyethyl p-dimethylaminobenzoate.

Other Components

Examples of such components include a colorant, a polymerization inhibitor, a surfactant, a photosensitizer, and a polar-group-containing polymeric pigment dispersant.

Colorant

Various dyes and pigments can be used in view of physical properties of the active energy ray curable composition. Specific examples of the pigments include, but are not limited to, inorganic pigments and organic pigments, such as black pigments, yellow pigments, magenta pigments, cyan pigments, white pigments, and glossy color pigments (e.g., gold, silver).

Polymerization Inhibitor

Specific examples of the polymerization inhibitor include, but are not limited to, 4-methoxy-1-naphthol, methyl hydroquinone, hydroquinone, t-butyl hydroquinone, di-t-butyl hydroquinone, methoquinone, 2,2'-dihydroxy-3,3'-di(α-methylcyclohexyl)-5,5'-dimethyldiphenylmethane, p-benzoquinone, di-t-butyl diphenyl amine, 9,10-di-n-butoxyanthracene, and 4,4'-[1,10-dioxo-1,10-decanediylbis(oxy)]bis [2,2,6,6-tetramethyl]-1-piperidinyloxy.

Surfactant

Specific examples of the surfactant include, but are not limited to, higher-fatty-acid-based surfactants, silicone-based surfactants, and fluorine-based surfactants.

Preferably, the active energy ray curable composition according to an embodiment of the present invention is solventless.

To be solventless refers to a state in which any known solvent, such as ether, ketone, aromatic solvents, xylene, ethyl ethoxypropionate, ethyl acetate, cyclohexanone, diethylene glycol monomethyl ether, diethylene glycol monoethyl ether, γ-butyl lactone, ethyl lactate, cyclohexane methyl ethyl ketone, toluene, ethyl ethoxypropionate, polymethacrylate or propylene glycol monomethyl ether acetate, ethylene glycol monomethyl ether, diethylene glycol, and triethylene glycol monobutyl ether, is not included.

When the active energy ray curable composition is solventless and used for an ink, the ink film includes no residual volatile organic solvent. This improves safety at printing sites and prevents environment pollution. In addition, the ink is not likely to dry at heads, thus making the printer maintenance much easier.

Use Application

The active energy ray curable composition can be applied to, for example, modeling resins, paints, adhesives, insulating materials, release agents, coating materials, sealing materials, resists, and optical materials.

For example, the active energy ray curable composition can be applied to active energy ray curable inks for forming two-dimensional texts and images. As another example, the active energy ray curable composition can be applied to stereoscopic modeling materials for forming three-dimensional images (i.e., stereoscopic modeled objects). In particular, the active energy ray curable composition is preferably used for active energy ray curable inks, in particular, inkjet inks.

The active energy ray curable ink according to an embodiment of the present invention exhibits good adhesion to plastic substrates and excellent strength.

The stereoscopic modeling material can be applied to additive manufacturing, material jetting, and optical modeling, each of which is one of stereoscopic modeling processes. In additive manufacturing, the stereoscopic modeling material is used as a binder of powder particles. In material jetting, the stereoscopic modeling material is discharged to a certain region and exposed to an active energy ray to cure, and the cured layers are sequentially laminated to form a stereoscopic object, as described in detail later referring to FIG. 5. In optical modeling, referring to FIGS. 1A to 1D, the stereoscopic modeling material 5 is retained in a pool 1 and exposed to an active energy ray 4 to be formed into a cured layer 6 on a movable stage 3, and the cured layers 6 are sequentially laminated to form a stereoscopic object.

Stereoscopic modeling apparatuses for forming stereoscope modeled objects with the active energy ray curable composition are not limited in structure and may include a storage for storing the active energy ray curable composition, a supplier, a discharger, and an active energy ray emitter.

Active Energy Ray Curable Composition Container

The active energy ray curable composition container according to an embodiment of the present invention includes a container and the above-described active energy ray curable composition contained in the container.

When the active energy ray curable composition is used for an ink, the active energy ray curable composition container serves as an ink cartridge of an ink bottle, which prevents user from directly contacting the ink when the user is replacing the ink, thus preventing user's fingers and clothes from being contaminated with the ink. In addition, the ink cartridge or ink bottle prevents foreign substances from being mixed into the ink. The container is not limited in shape, size, and material. Preferably, the container is made of a light-blocking material.

Ink Cartridge

An ink cartridge according to an embodiment of the present invention includes a container and the ink according to an embodiment of the present invention contained in the container. The container is not limited in shape, structure, size, and material. Examples of the container include, but are not limited to, an ink bag which may be formed of an aluminum laminate film or a resin film.

The Ink cartridge is described in detail below with reference to FIGS. 2 and 3.

Figure 2:
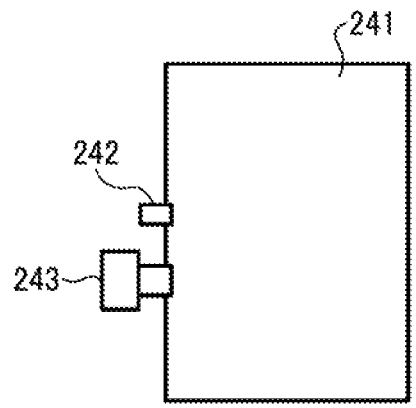
FIG. 2 is a schematic view of an ink bag according to an embodiment of the present invention.
Figure 3:
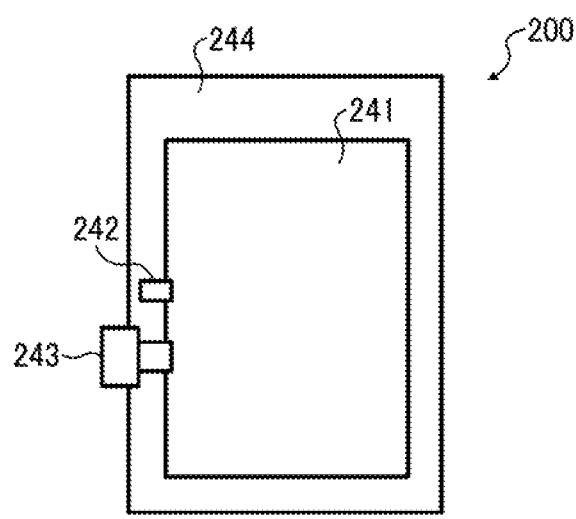
FIG. 3 is a schematic view of an ink cartridge including the ink bag illustrated in FIG. 2.

FIG. 2 is a schematic view of an ink bag 241. FIG. 3 is a schematic view of an ink cartridge 200 including a cartridge casing 244 storing the ink bag 241.

Referring to FIG. 2, an ink is filled in the ink bag 241 through an ink inlet 242. After the air remaining in the ink bag 241 is discharged, the ink inlet 242 is sealed by fusion. When the ink bag 241 is in use, an ink outlet 243, made of a rubber material, is pricked with a needle of the apparatus body, so that the ink is supplied to the apparatus body. The ink bag 241 may be formed of a wrapping material, such as an aluminum laminate film. Referring to FIG. 3, the ink bag 241 is stored in the cartridge casing 244 made of a plastic material, thus providing the ink cartridge 200. The ink cartridge 200 can be detachably attachable to cured product forming devices such as inkjet recording apparatuses.

The ink cartridge containing the ink is preferably detachably attached to cured product forming devices such as inkjet recording apparatuses. In this case, ink supply and ink replacement procedures can be simplified, thus improving workability.

Inkjet Recording Method

The inkjet recording method according to an embodiment of the present invention includes: applying a first active energy ray curable ink including a first active energy ray curable composition to a substrate; emitting a first active energy ray to the first active energy ray curable ink on the substrate; applying a second active energy ray curable ink including a second active energy ray curable composition to the first active energy ray curable ink having been irradiated with the first active energy ray; and emitting a second active energy ray to the second active energy ray curable ink. The first active energy ray curable composition and the second active energy ray curable composition each include the above-described active energy ray curable composition, and the first active energy ray curable composition and the second active energy ray curable composition are either the same or different. A first time period from the applying of the first active energy ray curable ink to the emitting of the first active energy ray is longer than a second time period from the applying of the second active energy ray curable ink to the emitting of the second active energy ray.

When the first time period from the applying of the first active energy ray curable ink to the emitting of the first active energy ray is longer than the second time period from the applying of the second active energy ray curable ink to the emitting of the second active energy ray, the first active energy ray curable ink in a fluidized state spreads over the substrate, thus increasing the adhesion area of the first active energy ray curable ink to the substrate. In addition, the first active energy ray curable ink in a liquid state remains on the substrate for a longer time, thus increasing the time during which the first active energy ray curable ink dissolves the substrate. The first active energy ray curable ink is cured thereafter, providing a good adhesion to the substrate. When the first time period from the applying of the first active energy ray curable ink to the emitting of the first active energy ray is 15 seconds or more, the above-described effects are more powerfully exerted.

The first active energy ray curable ink and the second active energy ray curable ink may include either the same or a different active energy ray curable composition. Preferably, the first active energy ray curable ink and the second active energy ray curable ink include the same active energy ray curable composition. When the first active energy ray curable ink and the second active energy ray curable ink include the same active energy ray curable composition, the inks provide good adhesion to the substrate and sufficient film strength at the same time. Therefore, it is more advantageous that the first active energy ray curable ink and the second active energy ray curable ink include the same active energy ray curable composition.

Substrate

Specific examples of the substrate for use in the inkjet recording method according to an embodiment of the present invention include, but are not limited to, paper, plastic, metals, ceramics, glass, and composite materials thereof.

Among these materials, non-permeable substrates are preferable since the active energy ray curable ink according to an embodiment of the present invention is immediately curable open light emission. In particular, plastic films and plastic moldings are preferable, which may be made of polyethylene, polypropylene, polyethylene terephthalate, polycarbonate, ABS (acrylonitrile butadiene styrene) resin, polyvinyl chloride, polystyrene, polyester, polyamide, vinyl materials, acrylic resin, and composite materials thereof.

When, polycarbonate or ABS resin is used for the substrate, the first and second active energy ray curable inks preferably include tetrahydrofurfuryl acrylate, tetrahydrofurfuryl methacrylate, cyclohexyl acrylate, cyclohexyl methacrylate, benzyl acrylate, benzyl methacrylate, acryloyl morpholine, and/or methacryloyl morpholine, since they have a high capability of dissolving polycarbonate and ABS resin. When acrylic resin is used for the substrate, the first and second active energy ray curable inks preferably include dimethylaminopropyl acrylamide since it has a high capability of dissolving acrylic resin.

Two-Dimensional or Three-Dimensional Image Forming Apparatus

A two-dimensional or three-dimensional image forming apparatus according to an embodiment of the present invention includes: an applier to apply the above-described active energy ray curable composition to a substrate, an emitter to emit an active energy ray; and a controller to control a time period from when the active energy ray curable composition is applied to when the active energy ray is emitted.

The two-dimensional or three-dimensional image forming apparatus may further include a container to contain the active energy ray curable composition. The two-dimensional or three-dimensional image forming apparatus may further include a discharger to discharge the active energy ray curable composition. The discharging method of the discharger may be of a continuous injection type or an on-demand type, but is not limited thereto. Specific examples of the on-demand-type discharging method include thermal methods and electrostatic methods. According to some embodiments, the discharger preferably includes a discharge head that discharges an ink to a substrate to form an image thereon.

Figure 4:
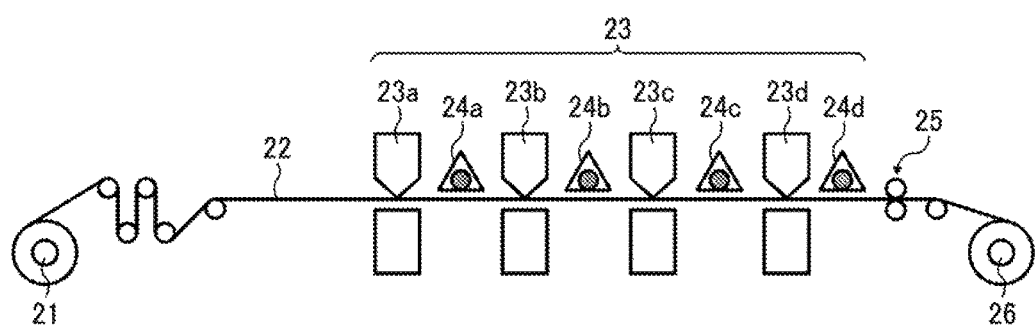
FIG. 4 is a schematic view of an image forming apparatus according to an embodiment of the present invention.

FIG. 4 is a schematic view of an image forming apparatus according to an embodiment of the present invention, which includes an inkjet discharger. The image forming apparatus illustrated in FIG. 4 includes printing units 23a, 23b, 23c, and 23d and a supply roller 21. Each of the printing units 23a, 23b, 23c, and 23d includes an ink cartridge containing an active energy ray curable ink having yellow, magenta, cyan, and black colors, respectively, and a discharge head. The inks are discharged to a recording medium 22 supplied by the supply roller 21. Light sources 24a, 24b, 24c, and 24d emit active energy rays to the respective inks on the recording medium 22 to cause the inks to cure and form color images. The recording medium 22 is then conveyed to a winding roller 26 via a processing unit 25. Each of the printing units 23a, 23b, 23c, and 23d is equipped with a heater for heating the ink at the inkjet discharger. Furthermore, the printing units 23a, 23b, 23c, and 23d may be equipped with a cooler for cooling the recording medium to room temperature with or without contacting the recording medium. The image forming apparatus illustrated in FIG. 4 may be an inkjet recording apparatus employing a serial method or a line method. In the serial method, ink is discharged from a moving discharge head onto a recording medium that is intermittently moved in accordance with the width of the discharge head. In the line method, ink is discharged from a fixed discharge head onto a recording medium that is continuously moved.

Specific preferred materials for the recording medium 22 include, but are not limited to, paper, film, metal, and composite materials thereof, which may be in the form of a sheet. The image forming apparatus illustrated in FIG. 4 may be capable of either one-side printing or duplex printing.

It is possible that the light sources 24a, 24b, and 24c emit weakened active energy rays or no active energy ray and the light source 24d emits an active energy ray after multiple color images have been printed. In this case, energy consumption and cost are reduced.

Recorded matters recorded by the ink according to an embodiment of the present invention include those printed on smooth surfaces such as normal paper and resin films, those printed on irregular surfaces, and those printed on surfaces of various materials such as metal and ceramics. By laminating two-dimensional images, a partially-stereoscopic image (including two-dimensional parts and three-dimensional parts) or a stereoscopic product can be obtained.

Figure 5:
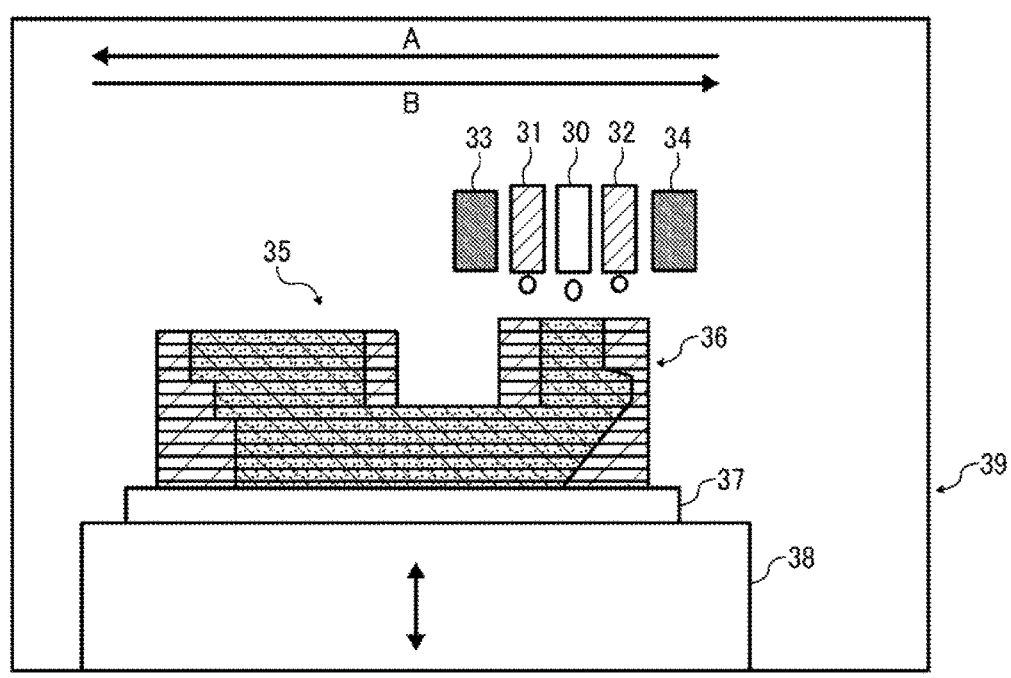
FIG. 5 is a schematic view of an image forming apparatus according to an embodiment of the present invention.

FIG. 5 is a schematic view of a three-dimensional image forming apparatus according to another embodiment of the present invention. Referring to FIG. 5, an image forming apparatus 39 includes a discharge head unit 30 for forming modeled object layers, discharge head units 31 and 32 for forming support layers, and ultraviolet emitters 33 and 34 adjacent to the discharge head units 30, 31, and 32. Each of the discharge head units 30, 31, and 32 includes an inkjet head and is movable in the directions indicated by arrows A and B in FIG. 5. The discharge head unit 30 discharges a first active energy ray curable composition, and the discharge head units 31 and 32 each discharge a second active energy ray curable composition different from the first active energy ray curable composition. The ultraviolet emitters 33 and 34 cause the active energy ray curable compositions to cure. The cured products are laminated in the image forming apparatus 39. More specifically, first, the second active energy ray curable composition is discharged from the discharge head units 31 and 32 onto a modeled object supporting substrate 37 and exposed to an active energy ray to cure, thus forming a first support layer having a reservoir. Next, the first active energy ray curable composition is discharged from the discharge head unit 30 onto the reservoir and exposed to an active energy ray to cure, thus forming a first modeled object layer. These processes are repeated multiple times, in accordance with the set number of lamination, while lowering a stage 38 that is movable in the vertical direction, to laminate the support layers and the modeled object layers. Thus, a stereoscopic modeled object 35 is obtained. A support layer lamination 36 is removed thereafter, if necessary. In the embodiment illustrated in FIG. 5, the number of discharge head unit 30 for forming modeled object layers is one. Alternatively, the number thereof may be two or more.

Cured Product and Processed Product

The cured product according to an embodiment of the present invention is obtainable by causing the active energy ray curable composition to cure. The processed product according to an embodiment of the present invention is obtainable by processing the cured product formed on a substrate, such as a recording medium.

More specifically, the cured product according to an embodiment of the present invention is obtainable by causing the active energy ray curable composition to cure by the action of an active energy ray. For example, the cured product can be obtained by forming a coated film (image) of the active energy ray curable composition on a substrate by an inkjet discharge device and emitting ultraviolet ray to the coated film formed on the substrate to cause the coated film to rapidly cure.

Specific examples of the substrate for use in forming the cured product include, but are not limited to paper, plastic, metals, ceramics, glass, and composite materials thereof.

Among these materials, plastic substrates are preferable in terms of processability. In particular, plastic films and plastic moldings are preferable, which may be made of polyethylene, polypropylene, polyethylene terephthalate, polycarbonate, ABS (acrylonitrile butadiene styrene) resin, polyvinyl chloride, polystyrene, polyester, polyamide, vinyl materials, acrylic resin, and composite materials thereof.

The processed product according to an embodiment of the present invention is obtainable by processing (e.g., stretching-processing or punching-processing) a surface-decorated article of the cured product formed on the substrate.

The processed product is preferably used for meters and operation panels of automobiles, office automation equipments, electric or electronic devices, and cameras, which typically need to be surface-decorated.

EXAMPLES

Having generally described this invention, further understanding can be obtained by reference to certain specific examples which are provided herein for the purpose of illustration only and are not intended to be limiting. In the descriptions in the following examples, the numbers represent weight ratios in parts, unless-otherwise specified.

In the examples described below, the active energy ray curable compositions according to some embodiments of the present inventions are used for inkjet inks.

Examples 1 to 8 and Comparative Examples 1 and 2

Preparation of Active Energy Ray Curable Inkjet Inks

Raw materials described in Table 1 were added to a vessel one by one while being stirred. After one hour of stirring, it was confirmed that no raw material existed without being dissolved. The resulting mixture was filtered with a membrane filter so that coarse particles, which would clog inkjet heads, were removed. Thus, active energy ray curable inkjet inks of Examples 1 to 8 and Comparative Examples 1 and 2 were prepared. In Table 1, numerical values for polymerizable compounds, colorants, and polymerization initiators represent mass ratios in parts.

Cured products of the above-prepared active energy ray curable inkjet inks were prepared as follows:
Preparation of Cured Products for Measurement of Glass Transition Temperature and Storage Elastic Modulus Each active energy ray curable inkjet ink was formed into a film having an average thickness of 10 μm on a polypropylene substrate using a wire bar (Winding #6 available from Kobayashi Engineering Works., Ltd.). After a lapse of 15 seconds, the film was irradiated with an active energy ray having a wavelength within the UV-A region (from 350 to 400 nm) and a light quantity of 1,500 mJ/cm$^2$ emitted from a UV emitter (LH6 available from Fusion UV Systems Japan K.K.), thus obtaining a cured product.

In measuring storage elastic modulus, this procedure was repeated three times to laminate three film layers. This is because single film layer, having a thickness of 10 μm, was likely to crack due to its thinness and difficult to handle due to its low stiffness, which was not suitable in measuring storage elastic modulus.

Preparation of Cured Products for Measurement of Strength and Adhesion

Each active energy ray curable inkjet ink was formed into a film having an average thickness of 10 μm on a substrate using a wire bar (Winding #6 available from Kobayashi Engineering Works., Ltd.). After a lapse of 15 seconds, the film was irradiated with an active energy ray having a wavelength within the UV-A region (from 350 to 400 nm) and a light quantity of 1,500 mJ/cm$^2$ emitted from a UV emitter (LH6 available from Fusion UV Systems Japan K.K.), thus obtaining a cured product.

As the substrate, a polycarbonate (PC) film (Iupilon® 100FE2000 (MM) Masking, having a thickness of 100 μm, available from Mitsubishi Engineering-Plastics Corporation) was used.

The above-prepared cured products were subjected to evaluations of their glass transition temperature, storage elastic modulus, strength, and adhesion to the substrate in the following manner. Evaluation results were shown in Table 1.

Evaluation of Glass Transition Temperature and Storage Elastic Modulus of Cured Product Each cured product on the polypropylene substrate was cut into a piece having a width of 10 mm and a length of 40 mm, gently peeled off, and subjected to a measurement with a dynamic viscoelasticity measuring instrument DMS6100 (available from Seiko Instruments Inc.) while setting the distance between chucks to 20 mm, the measurement frequency to 1 Hz, the measurement temperature range to from 30° C. to 130° C., and the temperature rising rate to 1° C./min.

Glass transition temperature was determined from a peak top temperature with respect to tan δ in the resulting profile.

Storage elastic modulus (E') at 60° C. was read from the profile.

Evaluation of Strength

A cylindrical weight having a flat upper surface (having a bottom area of 78.5 mm$^2$ and a weight of 10 g) was put on each cured product and another cylindrical weight (having a weight of 1 kg) was further put thereon. The cured product, along with the weights put thereon, was put in a thermostatic chamber at a temperature of 60° C. and left for one day. After the weights were removed, the surface of the cured product was visually observed to determine whether a dent had been made by the weights or not.

A: No dent was made by the weights.

B: A dent was made by the weights, but the dent had not reached the substrate.

C: A dent made by the weights had reached the substrate.

Evaluation of Adhesion to Substrate

Each cured product was subjected to a cross-cut adhesion test defined in Japanese Industrial Standards K5400 to evaluate the adhesion of the cured product to the substrate.

An adhesion of 100 refers to a state in which no peeling has occurred all over the cross-cut area having 100 lattices. An adhesion of 70 refers to a state in which no peeling has occurred within 70% of the cross-cut area.

Evaluation Criteria

A: The adhesion was in the range of from 95 to 100.
B: The adhesion was in the range of from 70 to 94.
C: The adhesion was less than 70.

Evaluation of Substrate-Dissolving Property of Polymerizable Compounds

Whether a polymerizable compound was capable of dissolving a substrate or not was determined by the potting test described below.

In the potting test, one drop of a polymerizable compound was placed on the surface of a polycarbonate substrate or the other substrate in use with a dropper, and 15 seconds later, the polymerizable compound was wiped off with a wiper (BEMCOT® M-3II available from Asahi Kasei Corporation) which was not likely to produce fiber waste. Whether the polycarbonate substrate or the other substrate in use had been dissolved by the polymerizable compound or not was determined by visually observing the substrate with a loupe of 25 magnifications (PEAK POCKET MICROSCOPE 25× available from Tohkai Sangyo Co., Ltd.) and touching it with fingers.

It was confirmed that all the polymerizable compounds capable of dissolving the substrate described in Table 1 caused the substrate to undergo a surface change, which indicated that all the polymerizable compounds were capable of dissolving the substrate.

Evaluation of Substrate-Dissolving Property of Inks

Each active energy ray curable ink was subjected to an evaluation of substrate-dissolving property (15 seconds) as follows.

Evaluation results are shown in Table 1.

One drop of the active energy ray curable ink was placed on the surface of the polycarbonate substrate or the other substrate in use with a dropper, and 15 seconds later, the active energy ray curable ink was wiped off with a wiper (BEMCOT® M-3II available from Asahi Kasei Corporation) which was not likely to produce fiber waste. Whether the substrate had been dissolved by the ink or not was determined by visually observing the substrate with a loupe of 25 magnifications (PEAK POCKET MICROSCOPE 25× available from Tohkai Sangyo Co., Ltd.) and touching it with fingers.

Evaluation Criteria

A: The part of the substrate from which the ink had been wiped off had undergone a greater surface change compared to the other parts that had not been in contact with the ink. The changed surface had a roughness which could be sensed by fingers.

B: The part of the substrate from which the ink had been wiped off had undergone a greater surface change compared to the other parts that had not been in contact with the ink. The changed surface was opaque.

C: No surface change was observed.

Details of Polymerizable Compounds

Diethylacrylamide (DEAA available from KJ Chemicals Corporation): The homopolymer has a glass transition temperature of 81° C.

Isobornyl acrylate (IBXA available from Osaka Organic Chemical Industry Ltd.): The homopolymer has a glass transition temperature of 97° C.

Dimethylacrylamide (DMAA available from KJ Chemicals Corporation): The homopolymer has a glass transition temperature of 119° C.

Dicyclopentenyl acrylate (FA-511AS available from Hitachi Chemical Company, Ltd.): The homopolymer has a glass transition temperature of 120° C.

Tetrahydrofurfuryl acrylate (VISCOAT #150 available from Osaka Organic Chemical Industry Ltd.)

Benzyl acrylate (VISCOAT #160 available from Osaka Organic Chemical Industry Ltd.)

1,6-Hexanediol diacrylate (A-HD-N available from Shin Nakamura Chemical Co., Ltd.)

1,9-Nonanediol diacrylate (A-NOD-N available from Shin Nakamura Chemical Co., Ltd.)

Polyester-based Urethane Acrylate (UV-3000B available from The Nippon Synthetic Chemical Industry Co., Ltd.)

Details of Polymerization Initiators (Irg. 819: DETX=6:2)

Irg. 819: Bis(2,4,6-trimethylbenzoyl)-phenylphosphine oxide (IRGACURE 819 available from BASF)

DETX: 2,4-Diethylthioxanthone (KAYACURE DETX-S available from Nippon Kayaku Co., Ltd.)

Detail of Carbon black

A mixture of 3 parts by mass of a carbon black (MITSUBISHI® Carbon Black #10 available from Mitsubishi Chemical Corporation) and 1 part by mass of a polymer disperser (S32000 available from The Lubrizol Corporation).

TABLE 1

| | | | Tg | Examples | | | | | | | | Comparative Examples | |
|---|---|---|---|---|---|---|---|---|---|---|---|---|---|
| | | Compounds | (° C.) | 1 | 2 | 3 | 4 | 5 | 6 | 7 | 8 | 1 | 2 |
| Polymerizable Compound Composition | Monofunctional Polymerizable Compound (B) | Diethylacrylamide | 81 | 70 | | | | | | | | 60 | |
| | | Isobornyl acrylate | 97 | | 70 | | | | | 70 | | | 60 |
| | | Dimethylacrylamide | 119 | | | | 70 | | | | 35 | | |
| | | Dicyclopentenyl acrylate | 120 | | | 55 | | 45 | 70 | | | | |
| | Polymerizable Compound (A) Capable of Dissolving Polycarbonate Substrate | Tetrahydrofurfuryl acrylate | | | 20 | | | | | | 40 | | |
| | | Benzyl acrylate | | 20 | | 20 | 30 | 30 | 20 | 30 | 40 | | |
| | Difunctional Polymerizable Compound (C) | 1,6-Hexanediol diacrylate | | | | 15 | | 25 | | | 25 | | 40 |
| | | 1,9-Nonanediol diacrylate | | 10 | 10 | | | | | | | | |
| | | Polyester-based Urethane Acrylate/UV-3000B | | | | | | | 10 | | | | |
| Colorant | | Carbon Black | | 5 | 5 | 5 | 5 | 5 | 5 | 5 | 5 | 5 | 5 |
| Polymerization Initiator | | Irg. 819: DETX = 6:2 | | 10 | 10 | 10 | 10 | 10 | 10 | 10 | 10 | 10 | 10 |
| Adhesion | | | | 80 | 80 | 90 | 100 | 100 | 100 | 100 | 100 | 100 | 0 |
| | | | | A | A | A | A | A | A | A | A | A | C |

TABLE 1-continued

| Compounds | Tg (° C.) | Examples | | | | | | | | Comparative Examples | |
| --- | --- | --- | --- | --- | --- | --- | --- | --- | --- | --- | --- |
| | | 1 | 2 | 3 | 4 | 5 | 6 | 7 | 8 | 1 | 2 |
| Glass Transition Temp. (° C.) of Cured Product | | 65 | 70 | 105 | 80 | 75 | 70 | 65 | 65 | 40 | 100 |
| Storage Elastic Modulus (Mpa) of Cured Product | | 0.8 | 12 | 50 | 20 | 13 | 14 | 1 | 10 | 0.1 | 40 |
| Strength of Cured Product | | B | B | A | B | B | B | B | B | C | A |
| Substrate-dissolving Property (15 sec) | | B | B | B | A | A | B | A | A | A | C |

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. An active energy ray curable composition, comprising an oligomer and wherein a cured product thereof has a storage elastic modulus of $1 \times 10^6$ Pa or more at 60° C.

2. The active energy ray curable composition of claim 1, wherein the cured product has a glass transition temperature of 60° C. or more.

3. The active energy ray curable composition of claim 1, comprising
a polymerizable compound composition,
wherein, when the active energy ray curable composition is formed into a film having an average thickness of 10 μm on a substrate and, after a lapse of 15 seconds, the film is irradiated with an active energy ray having a light quantity of 1,500 mJ/cm² to become the cured product, the cured product satisfies the following condition: when the substrate is a polycarbonate substrate, an adhesion between the polycarbonate substrate and the cured product is 70 or more, the adhesion being measured according to a cross-cut adhesion test defined in Japanese Industrial Standards K5400.

4. The active energy ray curable composition of claim 3, wherein the polymerizable compound composition includes a polymerizable compound (A) capable of dissolving the polycarbonate substrate.

5. The active energy ray curable composition of claim 3, wherein the polymerizable compound composition includes a monofunctional polymerizable compound (B) having one polymerizable ethylenic unsaturated double bond, the homopolymer of which having a glass transition temperature of 90° C. or more.

6. The active energy ray curable composition of claim 5, wherein the polymerizable compound composition further includes a polymerizable compound (A) capable of dissolving the polycarbonate substrate,
wherein the monofunctional polymerizable compound (B) accounts for 60% by mass or more of the polymerizable compound composition, and the polymerizable compound (A) accounts for 30% by mass or more of the polymerizable compound composition.

7. The active energy ray curable composition of claim 3, wherein the polymerizable compound composition further comprises a polyfunctional polymerizable compound (C) having at least two polymerizable ethylenic unsaturated double bonds.

8. The active energy ray curable composition of claim 7, wherein the polymerizable compound composition further includes a monofunctional polymerizable compound having one polymerizable ethylenic unsaturated double bond, and
wherein the total of said oligo and said polyfunctional polymerizable compound (C) accounts for 5% by mass or more and less than 20% by mass of the polymerizable compound composition, and the monofunctional polymerizable compound accounts for 80% by mass or more and less than 95% by mass of the polymerizable compound composition.

9. The active energy ray curable composition of claim 7, wherein the polymerizable compound composition further includes a polymerizable compound (A) capable of dissolving the polycarbonate substrate,
wherein the total of said oligo and said polyfunctional polymerizable compound (C) accounts for 20% by mass or more of the polymerizable compound composition, and the polymerizable compound (A) accounts for 30% by mass or more of the polymerizable compound composition.

10. An active energy ray curable ink, comprising:
the active energy ray curable composition of claim 1.

11. An inkjet ink, comprising:
the active energy ray curable ink of claim 10.

12. A stereoscopic modeling material, comprising:
the active energy ray curable composition of claim 1.

13. An active energy ray curable composition container, comprising:
a container; and
the active energy ray curable composition of claim 1 contained in the container.

14. An inkjet recording method, comprising:
applying a first active energy ray curable ink including a first active energy ray curable composition to a substrate;
emitting a first active energy ray to the first active energy ray curable ink on the substrate;
applying a second active energy ray curable ink including a second active energy ray curable composition to the first active energy ray curable ink having been irradiated with the first active energy ray; and
emitting a second active energy ray to the second active energy ray curable ink,
wherein the first active energy ray curable composition and the second active energy ray curable composition each include the active energy ray curable composition of claim 1, and the first active energy ray curable composition and the second active energy ray curable composition are either the same or different, and
wherein a first time period from the applying of the first active energy ray curable ink to the emitting of the first active energy ray is longer than a second time period from the applying of the second active energy ray curable ink to the emitting of the second active energy ray.

15. The inkjet recording method of claim 14, wherein the first time period from the applying of the first active energy ray curable ink to the emitting of the first active energy ray is 15 seconds or more.

16. A two-dimensional or three-dimensional image forming apparatus, comprising:
an applier to apply the active energy ray curable composition of claim 1 to a substrate;
an emitter to emit an active energy ray; and
a controller to control a time period from when the active energy ray curable composition is applied to when the active energy ray is emitted.

17. A cured product, produced by a method comprising:
emitting an active energy ray to the active energy ray curable composition of claim 1 to cause the active energy ray composition to cure.

18. A processed product, produced by a method comprising:
stretching-processing or punching-processing a cured product of the active energy ray curable composition of claim 1.

19. The active energy ray curable composition of claim 1, wherein the oligomer is a urethane oligomer.

20. An active energy ray curable composition, comprising
a polymerizable compound composition comprising an oligomer and,
wherein, when the active energy ray curable composition is formed into a film having an average thickness of 10 μm on a substrate and, after a lapse of 15 seconds, the film is irradiated with an active energy ray having a light quantity of 1,500 mJ/cm$^2$ to become the cured product, the cured product satisfies the following condition: when the substrate is a polycarbonate substrate, an adhesion between the polycarbonate substrate and the cured product is 70 or more, the adhesion being measured according to a cross-cut adhesion test defined in Japanese Industrial Standards K5400; and
wherein a cured product thereof has a storage elastic modulus of $1 \times 10^6$ Pa or more at 60° C.

* * * * *